United States Patent
Sebilleau et al.

(10) Patent No.: US 10,877,747 B1
(45) Date of Patent: Dec. 29, 2020

(54) CONFIGURING ENTERPRISE RESOURCE PLANNING SOFTWARE AND GENERATING A CUSTOMIZED REPORT ABOUT SOFTWARE CONFIGURATION

(71) Applicant: Accenture Global Solutions Limited, Dublin (IE)

(72) Inventors: Antoine Sebilleau, Neuilly (FR); Michel-Etienne Liegard, Le Kremlin Bicêtre (FR); Aymeric Piganeau, Paris (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/570,680

(22) Filed: Sep. 13, 2019

(51) Int. Cl.
 *G06F 8/71* (2018.01)
 *G06F 11/36* (2006.01)
(52) U.S. Cl.
 CPC ............ *G06F 8/71* (2013.01); *G06F 11/3692* (2013.01)
(58) Field of Classification Search
 CPC ............................... G06F 8/71; G06F 11/3692
 USPC .......................................................... 717/121
 See application file for complete search history.

(56) References Cited

U.S. PATENT DOCUMENTS

| | | | | |
|---|---|---|---|---|
| 2007/0061780 | A1* | 3/2007 | Pokluda | G06F 11/3672 717/124 |
| 2008/0120602 | A1* | 5/2008 | Comstock | G06F 11/3688 717/125 |
| 2015/0341240 | A1* | 11/2015 | Iyoob | G06Q 40/00 709/201 |
| 2017/0039038 | A1* | 2/2017 | Huber | G06F 11/3072 |
| 2019/0065350 | A1* | 2/2019 | Kunz | G06F 11/3692 |
| 2019/0155597 | A1* | 5/2019 | Lander | G06F 8/656 |

OTHER PUBLICATIONS

Co-pending U.S. Appl. No. 16/153,933, Entitled Web-Based Application Platform Applying Lean Production Methods to System Delivery Testing, by Michel-Etienne Liegard, filed Oct. 8, 2018, 31 pages.
Co-pending U.S. Appl. No. 15/952,491, Entitled "Generating Project Deliverables Using Objects of a Data Model" by Antoine Sebilleau, filed Apr. 13, 2018, 37 pages.

* cited by examiner

*Primary Examiner* — John Q Chavis
(74) *Attorney, Agent, or Firm* — Harrity & Harrity, LLP

(57) ABSTRACT

A device may receive operational data associated with software provided by an enterprise resource planning (ERP) platform, and may receive customization tables associated with the software provided by the ERP platform. The device may receive configuration data associated with the software provided by the ERP platform, and may receive test result data associated with the software provided by the ERP platform. The device may process the operational data, based on the configuration data, to identify a set of tasks, from tasks performed by the software, that have been configured, and may determine a plurality of links between the set of tasks and a plurality of customization tables, of the customization tables, based on the test result data. The device may perform one or more actions based on the operational data, the plurality of customization tables, the configuration data, and the plurality of links.

20 Claims, 13 Drawing Sheets

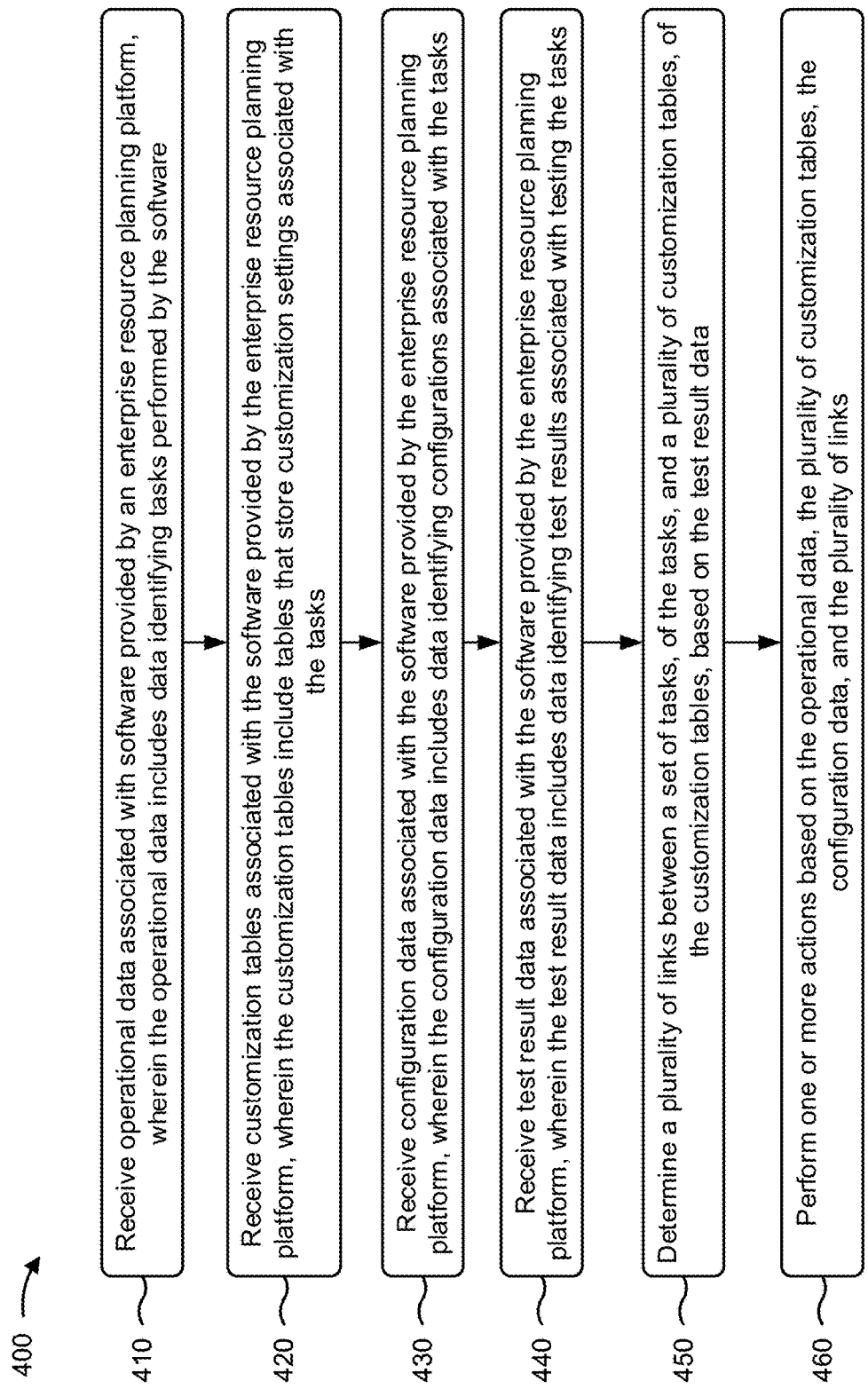

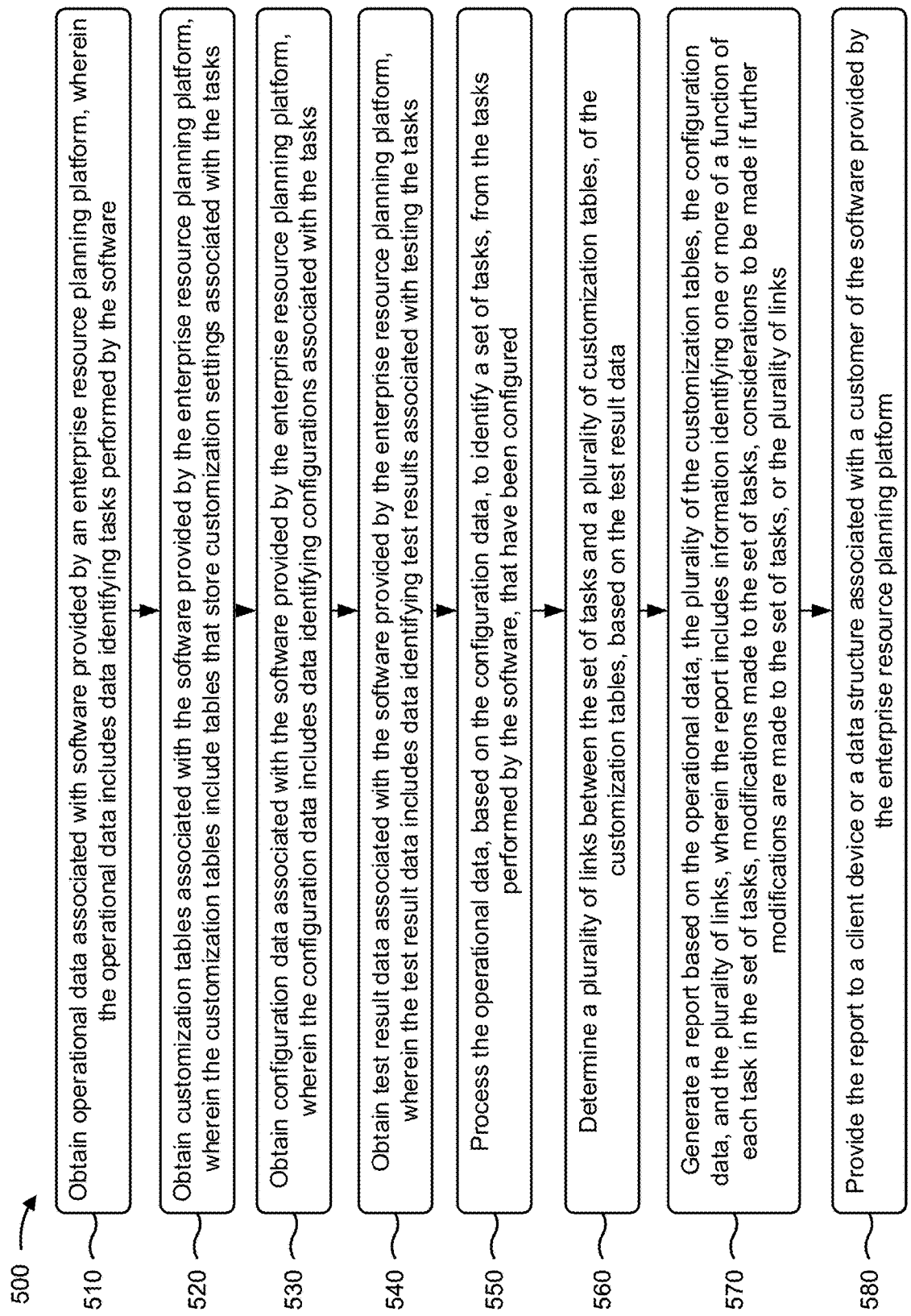

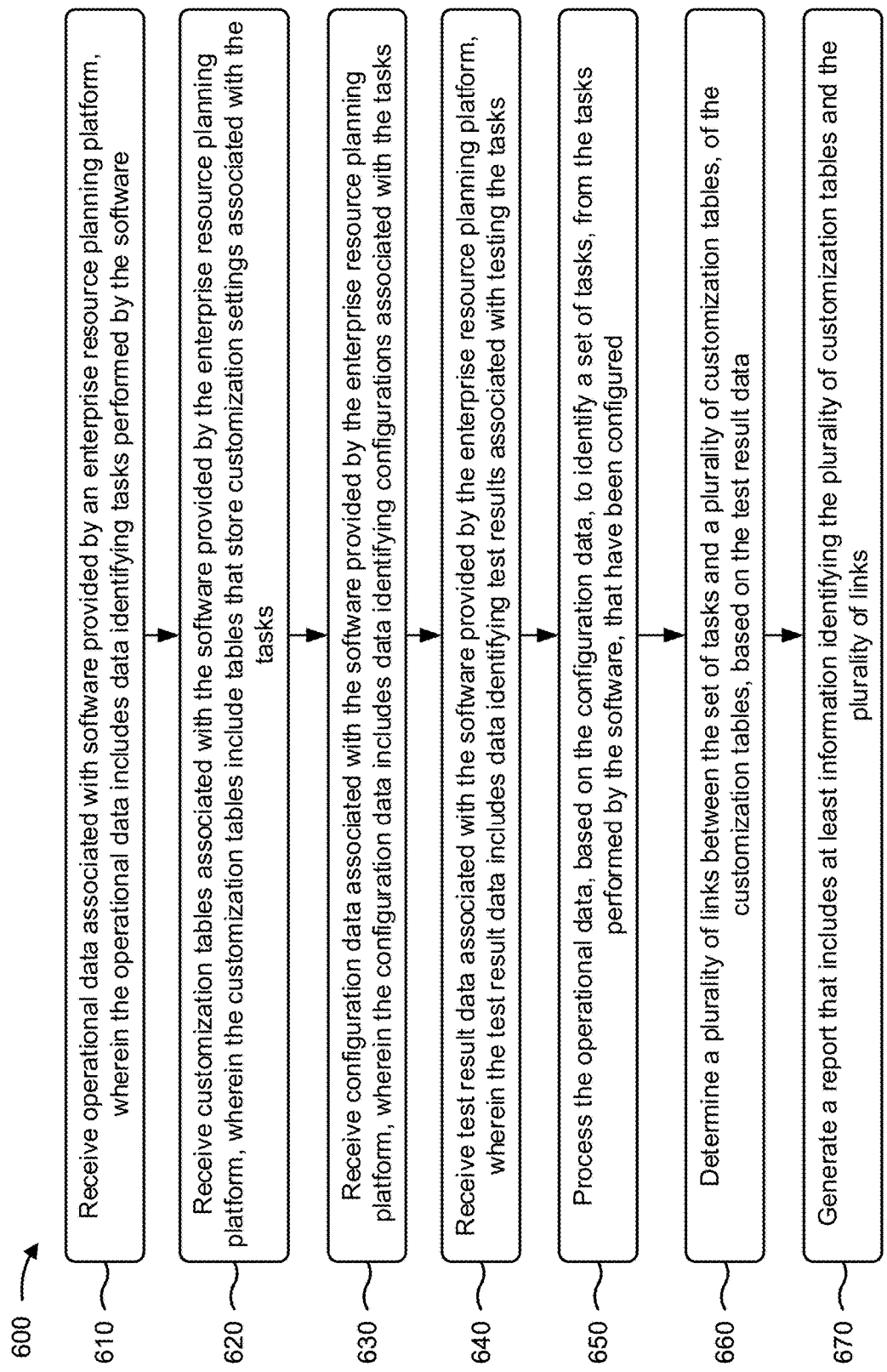

CONFIGURING ENTERPRISE RESOURCE PLANNING SOFTWARE AND GENERATING A CUSTOMIZED REPORT ABOUT SOFTWARE CONFIGURATION

BACKGROUND

Enterprise resource planning is integrated management of business processes, often in real-time and mediated by software and technology. An enterprise resource planning platform may include a suite of integrated applications that an organization can use to collect, store, manage, interpret, and/or the like data from business activities. The enterprise resource planning platform provides an integrated and continuously updated view of business processes using common databases maintained by a database management system. The enterprise resource planning platform tracks business resources (e.g., cash, raw materials, production capacity, and/or the like) and status of business commitments (e.g., orders, purchase orders, payroll, and/or the like). The software that makes up the enterprise resource planning platform shares data across various departments (e.g., manufacturing, purchasing, sales, accounting, and/or the like) that provide the data.

SUMMARY

According to some implementations, a method may include receiving operational data associated with software provided by an enterprise resource planning platform, wherein the operational data may include data identifying tasks performed by the software. The method may include receiving customization tables associated with the software provided by the enterprise resource planning platform, wherein the customization tables may include tables that store customization settings associated with the tasks. The method may include receiving configuration data associated with the software provided by the enterprise resource planning platform, wherein the configuration data may include data identifying configurations associated with the tasks. The method may include receiving test result data associated with the software provided by the enterprise resource planning platform, wherein the test result data may include data identifying test results associated with testing the tasks. The method may include determining a plurality of links between a set of tasks, of the tasks, and a plurality of customization tables, of the customization tables, based on the test result data, and performing one or more actions based on the operational data, the plurality of customization tables, the configuration data, and the plurality of links.

According to some implementations, a device may include one or more memories, and one or more processors, communicatively coupled to the one or more memories, to obtain operational data associated with software provided by an enterprise resource planning platform, wherein the operational data may include data identifying tasks performed by the software. The one or more processors may obtain customization tables associated with the software provided by the enterprise resource planning platform, wherein the customization tables may include tables that store customization settings associated with the tasks. The one or more processors may obtain configuration data associated with the software provided by the enterprise resource planning platform, wherein the configuration data may include data identifying configurations associated with the tasks. The one or more processors may obtain test result data associated with the software provided by the enterprise resource planning platform, wherein the test result data may include data identifying test results associated with testing the tasks. The one or more processors may process the operational data, based on the configuration data, to identify a set of tasks, from the tasks performed by the software, that have been configured, and may determine a plurality of links between the set of tasks and a plurality of customization tables, of the customization tables, based on the test result data. The one or more processors may generate a report based on the operational data, the plurality of customization tables, the configuration data, and the plurality of links, wherein the report may include information identifying one or more of a function of each task in the set of tasks, modifications made to the set of tasks, considerations to be made if further modifications are made to the set of tasks, or the plurality of links. The one or more processors may provide the report to a client device or a data structure associated with a customer of the software provided by the enterprise resource planning platform.

According to some implementations, a non-transitory computer-readable medium may store one or more instructions that, when executed by one or more processors of a device, may cause the one or more processors to receive operational data associated with software provided by an enterprise resource planning platform, wherein the operational data may include data identifying tasks performed by the software. The one or more instructions may cause the one or more processors to receive customization tables associated with the software provided by the enterprise resource planning platform, wherein the customization tables may include tables that store customization settings associated with the tasks. The one or more instructions may cause the one or more processors to receive configuration data associated with the software provided by the enterprise resource planning platform, wherein the configuration data may include data identifying configurations associated with the tasks. The one or more instructions may cause the one or more processors to receive test result data associated with the software provided by the enterprise resource planning platform, wherein the test result data may include data identifying test results associated with testing the tasks. The one or more instructions may cause the one or more processors to process the operational data, based on the configuration data, to identify a set of tasks, from the tasks performed by the software, that have been configured, and may determine a plurality of links between the set of tasks and a plurality of customization tables, of the customization tables, based on the test result data. The one or more instructions may cause the one or more processors to generate a report that includes at least information identifying the plurality of customization tables and the plurality of links.

BRIEF DESCRIPTION OF THE DRAWINGS

FIGS. 4-6 are flow charts of example processes for configuring enterprise resource planning software and generating a customized report about software configuration.

DETAILED DESCRIPTION

Figure 1A:
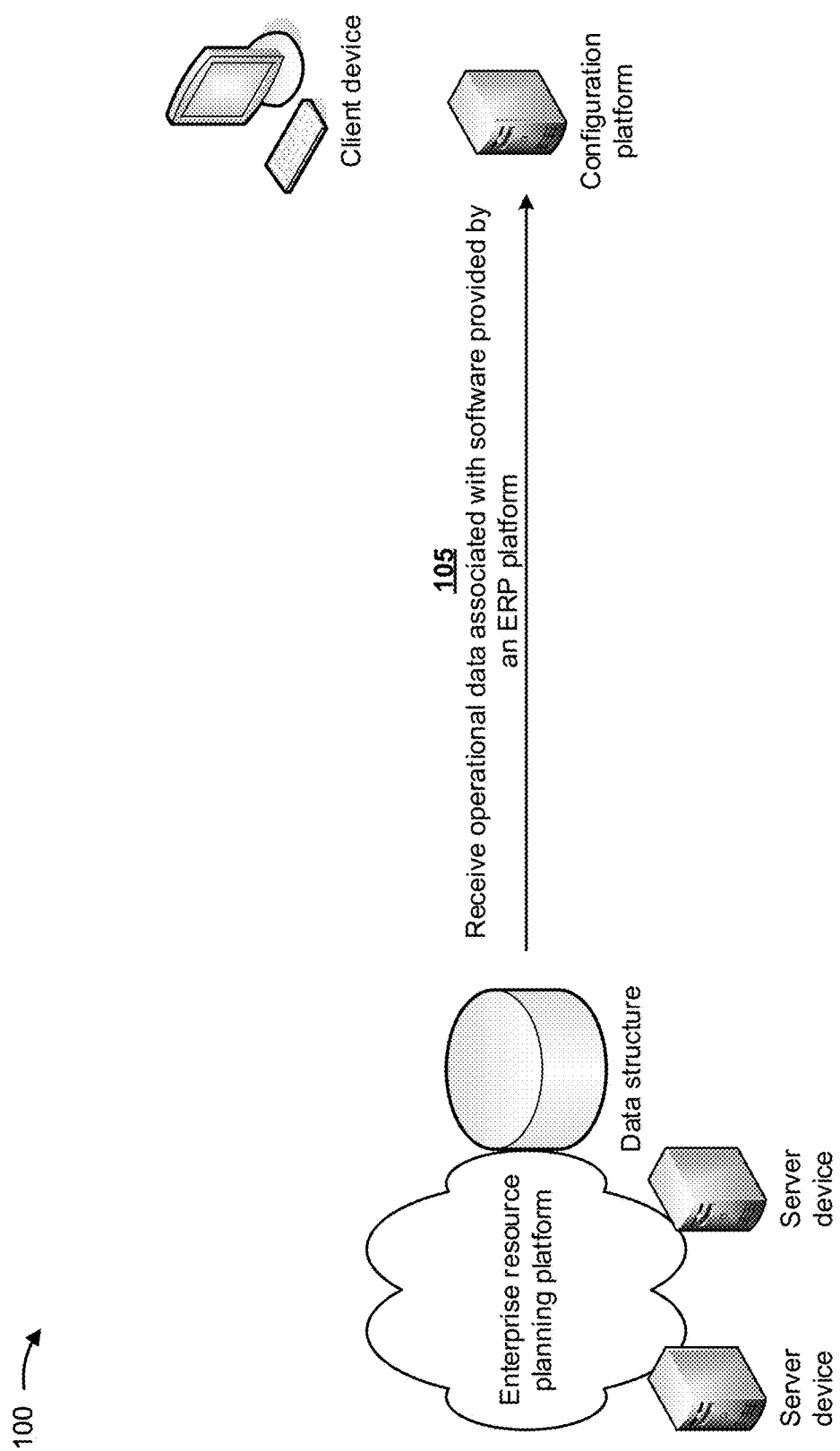
FIGS. 1A-1H are diagrams of one or more example implementations described herein.

The following detailed description of example implementations refers to the accompanying drawings. The same reference numbers in different drawings may identify the same or similar elements.

Software of an enterprise resource planning platform may be customized based on a customer's business requirements. The customized software may be developed and customized based on multiple configurations that may be stored in multiple (e.g., hundreds, thousands, and/or the like) customization tables. However, when the customized software is to be deployed to the customer, the developer must prepare documentation associated with the customized software. The documentation may include information describing the customized software, the multiple configurations, the multiple customization tables, and/or the like. The developer must pull the information from various sources in order to generate the report, which is a tedious and time-consuming process. This wastes computing resources (e.g., processing resources, memory resources, and/or the like), networking resources, and/or the like associated with searching for the information for the documentation, matching the customized software information with information associated with the multiple configurations and/or the multiple customization tables, generating the documentation, and/or the like.

Some implementations described herein provide a configuration platform that configures enterprise resource planning software and generates a customized report about software configuration. For example, the configuration platform may receive operational data associated with software provided by an enterprise resource planning platform, wherein the operational data may include data identifying tasks performed by the software. The configuration platform may receive customization tables associated with the software provided by the enterprise resource planning platform, wherein the customization tables may include tables that store customization settings associated with the tasks. The configuration platform may receive configuration data associated with the software provided by the enterprise resource planning platform, wherein the configuration data may include data identifying configurations associated with the tasks. The configuration platform may receive test result data associated with the software provided by the enterprise resource planning platform, wherein the test result data may include data identifying test results associated with testing the tasks. The configuration platform may process the operational data, based on the configuration data, to identify a set of tasks, from the tasks performed by the software, that have been configured, and may determine a plurality of links between the set of tasks and a plurality of customization tables, of the customization tables, based on the test result data. The configuration platform may perform one or more actions based on the operational data, the plurality of customization tables, the configuration data, and the plurality of links.

In the configuration platform configures enterprise resource planning software and generates a customized report about software configuration. This, in turn, conserves computing resources (e.g., processing resources, memory resources, and/or the like), networking resources, and/or the like that would otherwise be wasted searching for the information for the documentation, matching customized software information with information associated with multiple configurations and/or multiple customization tables, generating the documentation, and/or the like. Furthermore, the configuration platform enables the customized enterprise resource planning software to be provided to a customer with documentation that the customer may utilize to understand and utilize the customized enterprise resource planning software. This conserves resources that would otherwise be wasted receiving questions from the customer about the customized enterprise resource planning software, searching for answers to the questions, providing the answers to the customer, and/or the like.

FIGS. 1A-1H are diagrams of one or more example implementations 100 described herein. As shown in FIG. 1A, an enterprise resource planning (ERP) platform may be provided by multiple server devices and/or data structures or may be provided by a cloud computing environment that includes resources (e.g., processing resources, memory resources, network resources, server devices, and/or the like). The cloud computing environment may include the features described below in connection with FIG. 2. As further shown, the ERP platform may be associated with a configuration platform and/or a client device. For example, the configuration platform and/or the client device may enable an entity to access the ERP platform to utilize the resources of the ERP platform, software provided by the ERP platform, services provided by the ERP platform, and/or like. In some implementations, the configuration platform may be separate from but in communication with the ERP platform, may be implemented within the ERP platform, and/or the like.

As further shown in FIG. 1A, and by reference number 105, the configuration platform may receive operational data associated with software provided by the ERP platform. In some implementations, the configuration platform may receive or obtain the operational data from a data structure (e.g., a database, a table, a list, and/or the like) associated with the ERP platform. The configuration platform may periodically receive the operational data, may continuously receive the operational data, may receive the operational data based on a request, and/or the like. The configuration platform may store the operational data in a data structure associated with the configuration platform.

The operational data may include data identifying one or more tasks performed by the software, functionality of the software, a version of the software, source code of the software, and/or the like. A task may include an activity or a system transaction that can be executed within a workflow definition or independently (e.g., as a single step). The tasks performed by the software may include, for example, procurement of an item for a project, generating a schedule for the project, determining a milestone for the project (e.g., corresponding to deliverables for executing the project), determining a required payment for the project, generating a maintenance plan or order for equipment, generating a quality inspection plan, planning for capacity and resource availability, creating a sales plan, creating a purchase order, and/or the like.

In some implementations, the software provided by the ERP platform may include one or more customized software objects generated via the ERP platform, a design application customized for a customer, a project management application customized for a customer, a project administration application customized for a customer, and/or a delivery view application customized for a customer. The design application may include an application that configures templates based on requirements data or other user input, and that provides, for example, a user interface that enables viewing and browsing of templates. The project management application may include an application that controls or adjusts information describing a project's status, such as overall progress of the project and existing or prospective issues that might arise during execution of the project. The project administration application may include an application that performs various tasks that relate to administration of an ERP project and that controls access to various project datasets, client specific information, different applications of a production platform, and/or the like. The delivery view application may include an application that provides a graphical user interface that enables a user to view deliverables and validate design options (e.g., to indicate approval of a suggested design, process, or activity flow for executing an ERP project).

Figure 1B:
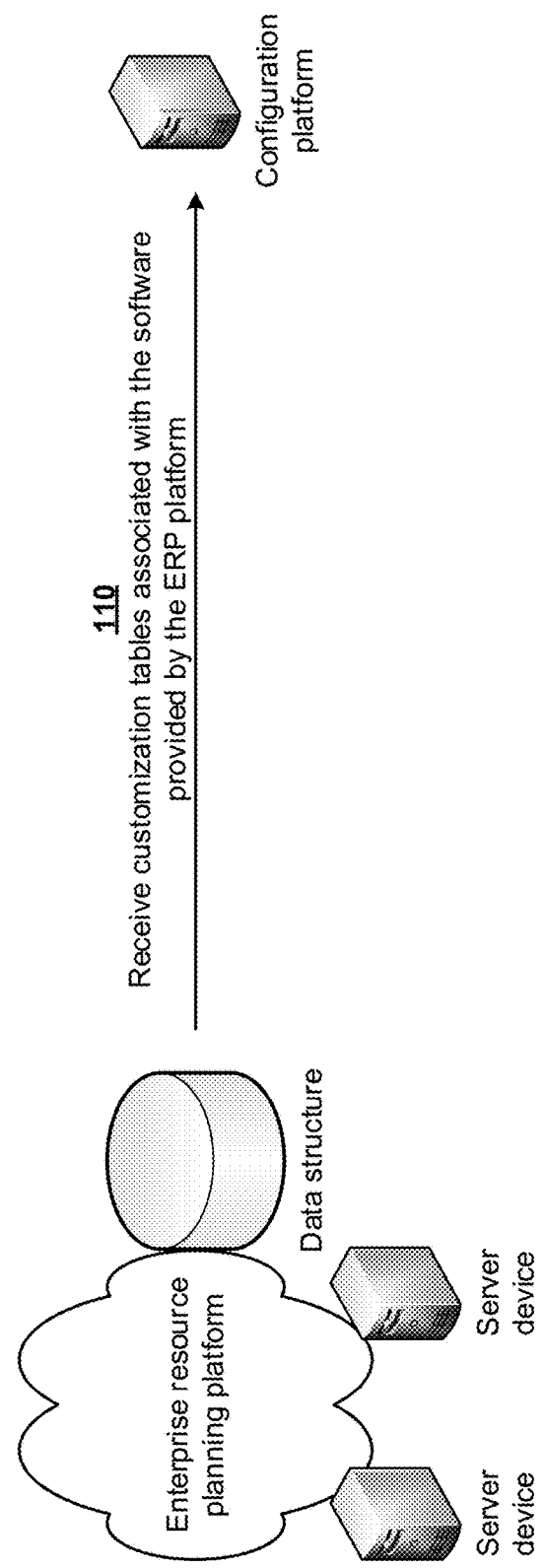

As shown in FIG. 1B, and by reference number 110, the configuration platform may receive customization tables associated with the software provided by the ERP platform. In some implementations, the configuration platform may receive or obtain the customization tables from the data structure associated with the ERP platform. The configuration platform may periodically receive the customization tables, may continuously receive the customization tables, may receive the customization tables based on a request, and/or the like. The configuration platform may store the customization tables in the data structure associated with the configuration platform.

In some implementations, the customization tables may include tables that store customization data (e.g., settings, such as parameters or values) associated with the tasks identified in the operational data. The customization data may be created by or for a customer when the software is customized for the customer. The customization tables may allow for customization of the software by changing parameters, changing values, changing or adding to standard features of the software, and/or the like in the customization tables rather than by directly modifying software code. Software that is utilized by numerous customers may be customized for a particular customer by selecting parameters, values, and/or the like that are specific to the customer's requirements and/or objectives. In practice, there may be hundreds, thousands, and/or the like of customization tables that may be associated with the software.

Figure 1C:
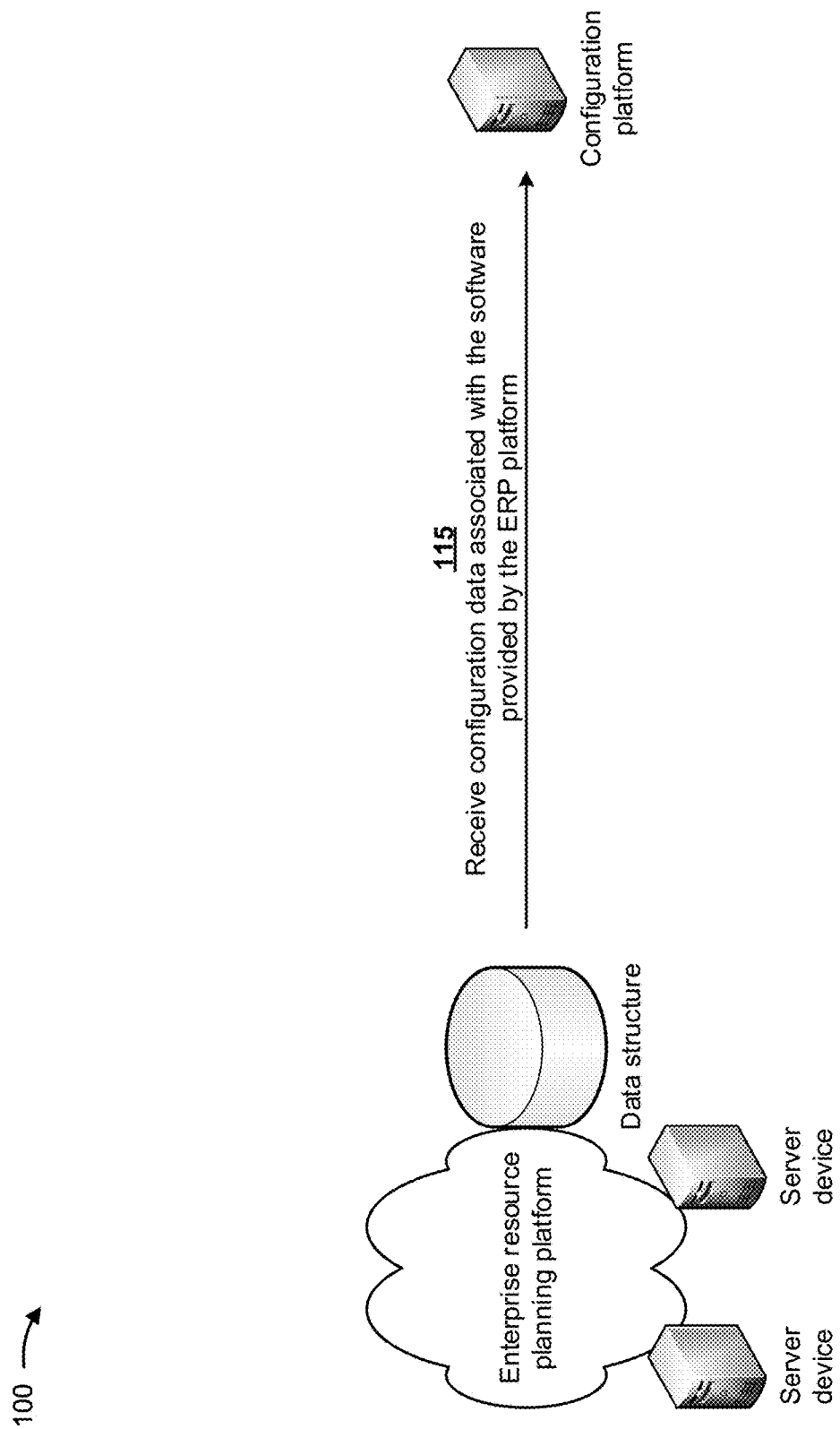

As shown in FIG. 1C, and by reference number 115, the configuration platform may receive configuration data associated with the software provided by the ERP platform. In some implementations, the configuration platform may receive or obtain the configuration data from the data structure associated with the ERP platform. The configuration platform may periodically receive the configuration data, may continuously receive the configuration data, may receive the configuration data based on a request, and/or the like. The configuration platform may store the configuration data in the data structure associated with the configuration platform.

In some implementations, the configuration data may include data identifying configurations associated with the tasks identified in the operational data. The configuration data may be associated with configuration of the software and may allow for portions of the software to be mapped to existing features of the software that are available to be included in the software without requiring additional customization. The configuration data may include data identifying any activity used to configure the software to meet customer requirements and/or a business process. For example, the configuration data may include data identifying creation of new manufacturing plants, changing settings in order types, configuring message outputs, and/or the like. The configuration data may include data associated with selecting specific functionality, from a list of functionality supported by the software (e.g., similar to setting defaults), so that the software is able to execute customer business processes (e.g., configures the software to meet needs of the customer by using existing data).

Figure 1D:
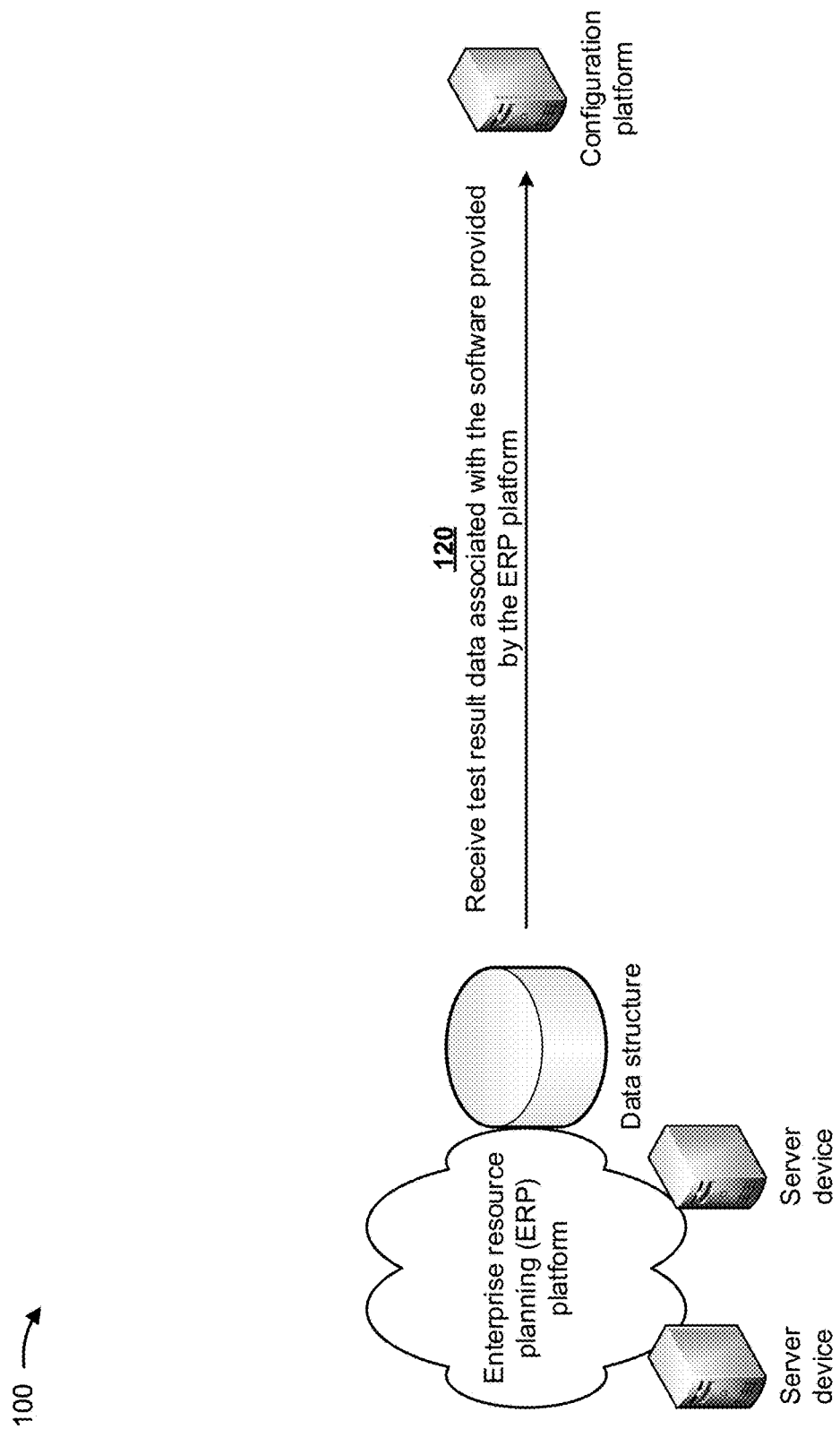

As shown in FIG. 1D, and by reference number 120, the configuration platform may receive test result data associated with the software provided by the ERP platform. In some implementations, the configuration platform may receive or obtain the test result data from the data structure associated with the ERP platform. The configuration platform may periodically receive the test result data, may continuously receive the test result data, may receive the test result data based on a request, and/or the like. The configuration platform may store the test result data in the data structure associated with the configuration platform.

In some implementations, the test result data may include data identifying test results associated with testing the tasks identified in the operational data. For example, the test result data may include data identifying results associated with testing functionalities associated with the tasks, results associated with testing multiple customized objects included in the software, results associated with testing outputs of the software, and/or the like. The test results may indicate whether the software, a task, and/or a customized object has been manipulated, modified, and/or the like, may identify customizations in the customization tables, may identify configurations made to the software, a task, and/or customized object based on the configuration data, and/or the like.

In some implementations, the test results may be generated based on data-driven testing of the software. Data-driven testing is a software testing methodology that utilizes a table of conditions directly as test inputs and verifiable outputs. Test environment settings and control are not hard-coded in data-driven testing. For example, a tester of the software may provide inputs from a row in a table and may expect outputs which occur in the same row. The table may include values that correspond to boundary or partition input spaces. In some implementations, the data-driven testing may include testing the software based on execution of one or more test scenarios (e.g., that include the tasks of the software), generating test results based on testing the software, and comparing the test results to expected results to provide a comparison as an output. The comparison may indicate whether the software, a task, and/or a customized object has been manipulated, modified, and/or the like, may identify customizations in the customization tables, may identify configurations made to the software, a task, and/or customized object based on the configuration data, and/or the like.

In some implementations, there may be hundreds, thousands, millions, and/or the like, of data points provided in the operational data, the customization tables, the configuration data, and/or the test result data. In this way, the configuration platform may handle thousands, millions, billions, and/or the like, of data points within a period of time (e.g., daily, weekly, monthly), and thus may provide "big data" capability.

Figure 1E:
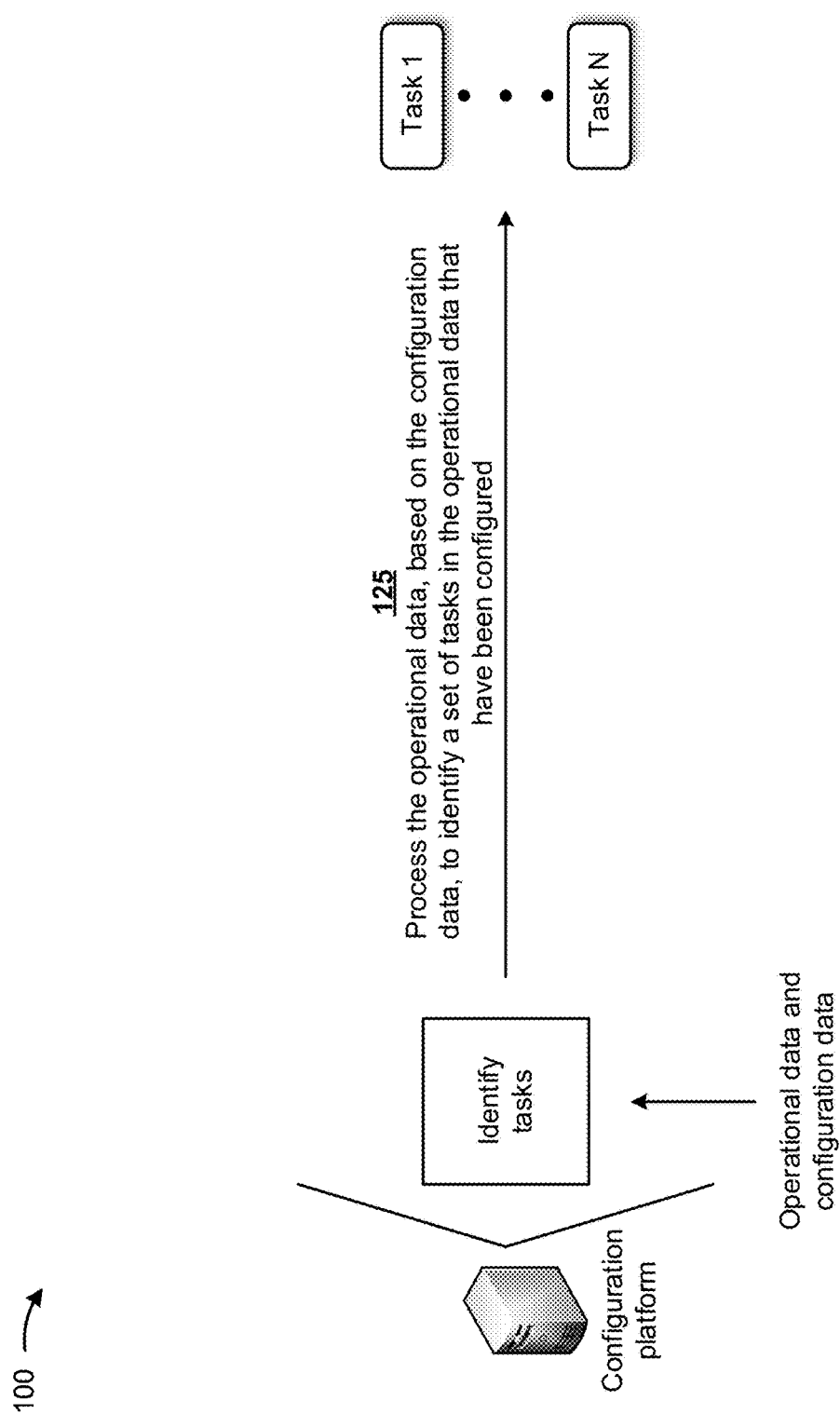

As shown in FIG. 1E, and by reference number 125, the configuration platform may process the operational data, based on the configuration data, to identify a set of tasks, from the tasks performed by the software, that have been configured. For example, the configuration platform may determine that a set of N tasks (e.g., a first task (e.g., task 1) through an Nth task (e.g., task N), as shown in FIG. 1E) in the operational data were configured. In some implementations, the configuration platform may process the operational data and the configuration data, with a machine learning model, to identify the set of tasks that have been configured. The machine learning model may include a clustering model, such as a k-means clustering model, a mean-shift clustering model, a density-based spatial clustering of applications with noise (DBSCAN) model, an expectation-maximization clustering using Gaussian mixture model, an agglomerative hierarchical clustering model, and/or the like. The machine learning model may classify the tasks into a specific group (e.g., the set of tasks) based on the configuration data (e.g., when the configuration data indicates that the tasks have been configured).

The machine learning model may be trained based on historical data (e.g., historical operational data and configuration data associated with software provided by the ERP platform). The configuration platform may separate the historical data into a training set, a validation set, a test set, and/or the like. The training set may be utilized to train the machine learning model. The validation set may be utilized to validate results of the trained machine learning model. The test set may be utilized to test operation of the trained machine learning model.

In some implementations, the configuration platform may train the machine learning model using, for example, an unsupervised training procedure and based on the historical data. For example, the configuration platform may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, the configuration platform may use a logistic regression classification technique to determine a categorical outcome (e.g., whether a task in the historical operational data has been configured). Additionally, or alternatively, the configuration platform may use a naïve Bayesian classifier technique. In this case, the configuration platform may perform binary recursive partitioning to split the historical data into partitions and/or branches and use the partitions and/or branches to determine outcomes (e.g., whether a task in the historical operational data has been configured). Based on using recursive partitioning, the configuration platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the configuration platform may use a support vector machine (SVM) classifier technique to generate a non-linear boundary between data points in the training set. In this case, the non-linear boundary is used to classify test data into a particular class.

Additionally, or alternatively, the configuration platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the configuration platform may use one or more other model training techniques, such as a neural network technique, a latent semantic indexing technique, and/or the like. For example, the configuration platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the configuration platform by being more robust to noisy, imprecise, or incomplete data, and by enabling the configuration platform to detect patterns and/or trends undetectable to human analysts or systems using less complex techniques.

In some implementations, rather than training a machine learning model, the configuration platform may receive a machine learning model from another device (e.g., a server device). For example, a server device may generate a machine learning model based on having trained the model in a manner similar to that described above and may provide the machine learning model to the configuration platform (e.g., may pre-load the configuration platform with the machine learning model, may receive a request from the configuration platform for the machine learning model, and/or the like). The configuration platform may perform a lookup to identify a machine learning model for a customer with particular characteristics, for particular software of the ERP platform, and/or the like. For example, the configuration platform may perform a lookup of a machine learning model based on one or more characteristics of a customer and/or the software. In other words, the configuration platform may utilize various machine learning models to make different predictions related to identifying a set of tasks that have been configured, thereby increasing an accuracy of making such predictions.

Figure 1F:
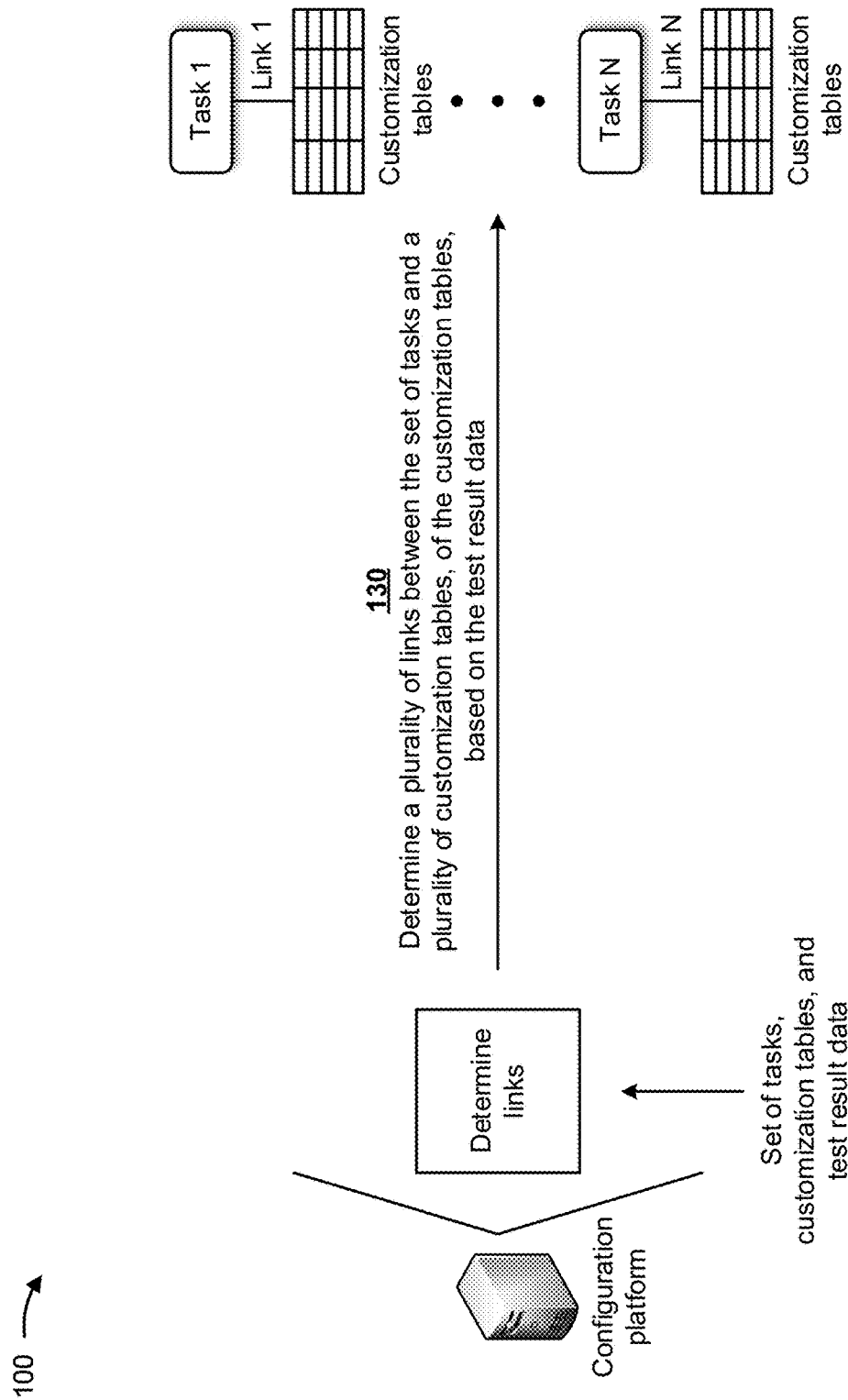

As shown in FIG. 1F, and by reference number 130, the configuration platform may determine a plurality of links between the set of tasks and a plurality of customization tables, of the customization tables, based on the test result data. For example, the configuration platform may determine a first link (e.g., link 1) between the first task (e.g., task 1) and one or more of the customization tables, through an Nth link (e.g., link N) between the Nth task (e.g., task N) and one or more of the customization tables, as shown in FIG. 1F. In some implementations, the configuration platform may determine a particular link (e.g., of the plurality of links) between a particular task (e.g., of the set of tasks) and a particular customization table (e.g., of the customization tables) when the test result data indicates that particular customization settings of the particular customization table were modified for the particular task. In some implementations, the configuration platform may prevent establishment of the particular link between the particular task and the particular customization table when the test result data indicates that particular customization settings of the particular customization table were not modified for the particular task.

In some implementations, the configuration platform may process the set of tasks, the customization tables, and the test result data, with a machine learning model, to determine the plurality of links between the set of tasks and the plurality of customization tables. The machine learning model may include a clustering model, such as a k-means clustering model, a mean-shift clustering model, a DBSCAN model, an expectation-maximization clustering using Gaussian mixture model, an agglomerative hierarchical clustering model, and/or the like. The configuration platform may train the machine learning model in a manner similar to that described above in connection with FIG. 1E.

In some implementations, rather than training a machine learning model, the configuration platform may receive a machine learning model from another device (e.g., a server device). For example, a server device may generate a machine learning model based on having trained the model in a manner similar to that described above in connection with FIG. 1E and may provide the machine learning model to the configuration platform. The configuration platform may perform a lookup to identify a machine learning model for a customer with particular characteristics, for particular software of the ERP platform, and/or the like. For example, the configuration platform may perform a lookup of a machine learning model based on one or more characteristics of a customer and/or the software. In other words, the configuration platform may utilize various machine learning models to make different predictions related to determining the plurality of links between the set of tasks and the plurality of customization tables, thereby increasing an accuracy of making such predictions.

Figure 1G:
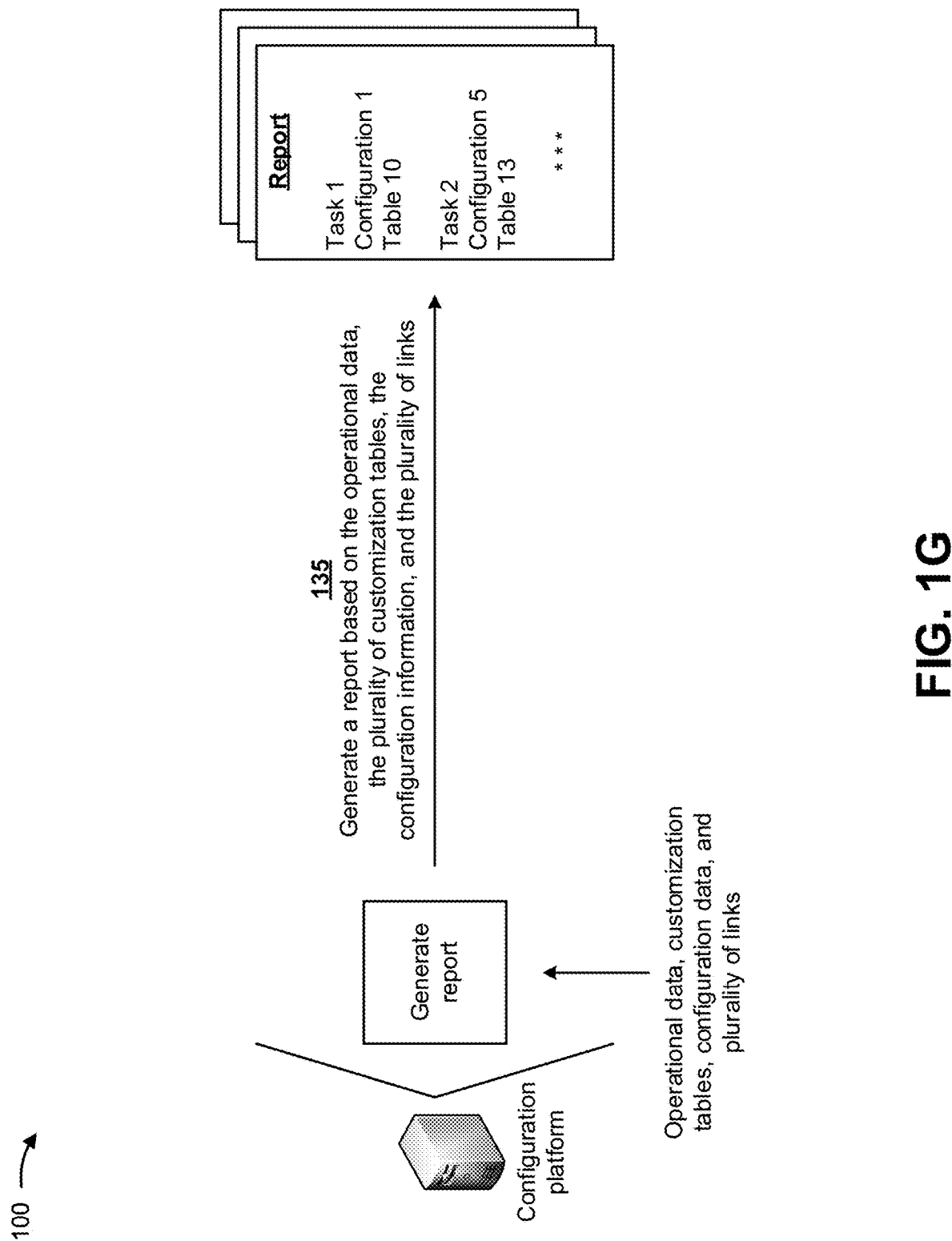

As shown in FIG. 1G, and by reference number 135, the configuration platform may generate a report based on the operational data, the plurality of customization tables, the configuration data, and the plurality of links. The report may include information identifying a function of each task in the set of tasks, modifications made to the set of tasks, considerations to be made if further modifications are made to the set of tasks, the plurality of links, and/or the like. For example, the report may associate the first task (e.g., task 1) with a particular configuration (e.g., configuration 1) identified in the configuration data and a particular customization table (e.g., table 10) identified in the customization tables, may associate the second task (e.g., task 2) with another particular configuration (e.g., configuration 5) identified in the configuration data and another particular customization table (e.g., table 13) identified in the customization tables, and/or the like, as shown in FIG. 1G.

In some implementations, the configuration platform may automatically populate one or more documents with information that is based on the operational data, the plurality of customization tables, the configuration data, the plurality of links, and/or the like. The report may include the one or more documents. Alternatively, or additionally, the configuration platform may generate one or more documents that include information indicating customizations made to the software at particular locations, explanations of the tasks performed by the software, considerations to be taken into account by the customer if the customer wishes to further customize the software, and/or the like, and may combine the one or more documents into the report.

In some implementations, the configuration platform may generate the report in one or more formats associated with one or more different software applications (e.g., a word processing application, a spreadsheet application, and/or the like). The configuration platform may integrate the report with one or more objects, features, deliverables, software, and/or the like provided by the ERP platform. In this way, the configuration platform may provide the report in a form that can be readily utilized by the customer (e.g., explains all modifications and customizations made to the software), that can be imported into other applications, systems, and/or platforms of the customer, and/or the like.

Figure 1H:
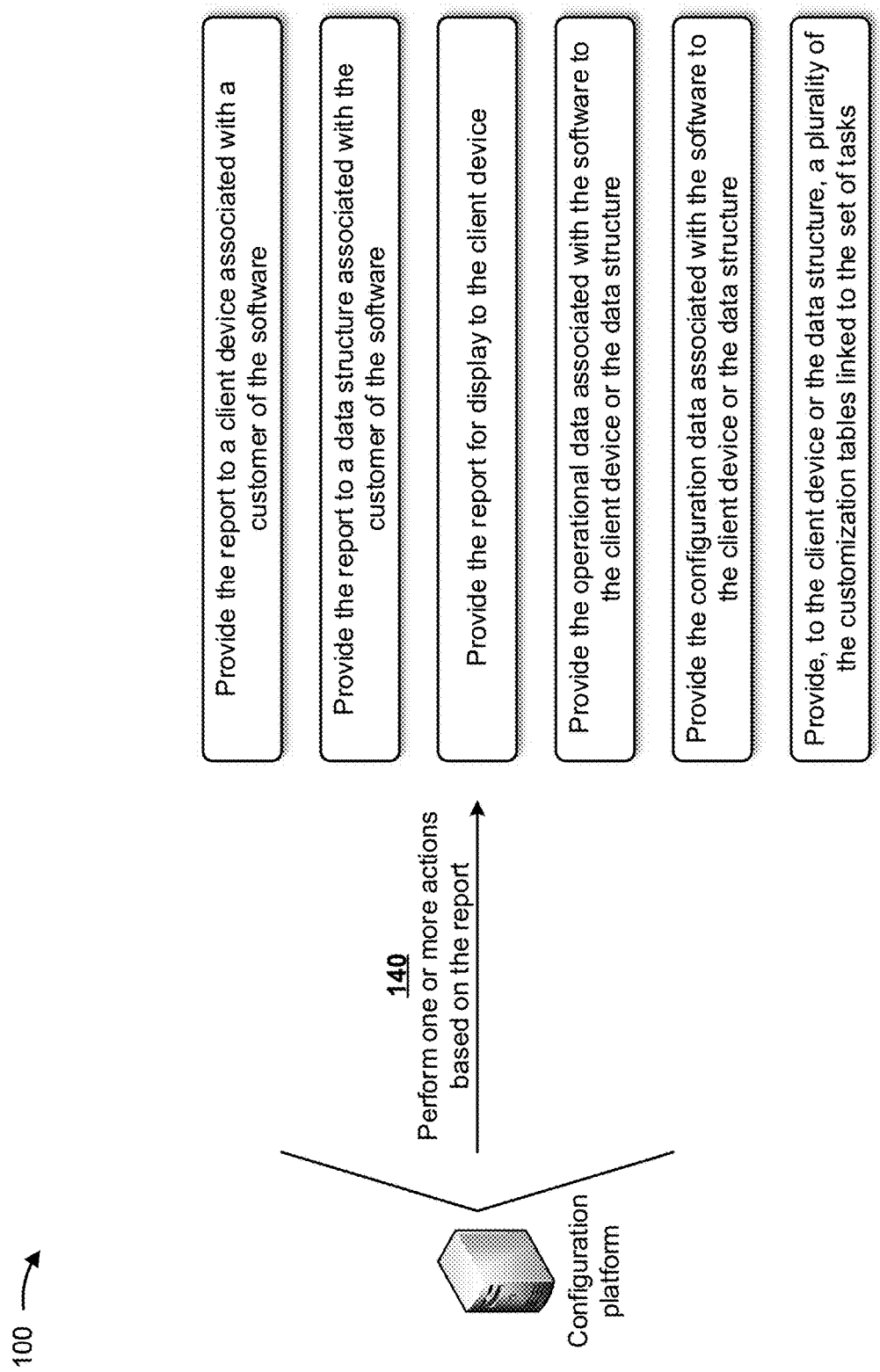

As shown in FIG. 1H, and by reference number 140, the configuration platform may perform one or more actions based on the report. In some implementations, the one or more actions may include the configuration platform providing the report to a client device associated with a customer of the software provided by the ERP platform. In this way, the configuration platform provides the customized ERP software with documentation that the customer may utilize to understand and utilize the customized ERP software. This conserves resources that would otherwise be wasted receiving questions from the customer about the customized ERP software, searching for answers to the questions, providing the answers to the customer, and/or the like.

In some implementations, the one or more actions may include the configuration platform providing the report to a data structure associated with a customer of the software provided by the enterprise resource planning platform. In this way, the configuration platform provides the customized ERP software with documentation that the customer may utilize to understand and utilize the customized ERP software, to import into a customer system, and/or the like. This conserves resources that would otherwise be wasted receiving questions from the customer about the customized ERP software, searching for answers to the questions, providing the answers to the customer, and/or the like.

In some implementations, the one or more actions may include the configuration platform providing the report, for display, to the client device. In this way, the configuration platform provides for display documentation that the customer may utilize to understand and utilize the customized ERP software. This conserves resources that would otherwise be wasted receiving questions from the customer about the customized ERP software, searching for answers to the questions, providing the answers to the customer, and/or the like.

In some implementations, the one or more actions may include the configuration platform providing the operational data associated with the software to a client device or a data structure associated with a customer of the software provided by the ERP platform. In this way, the configuration platform may provide operational data of the software that enables a more comprehensive understanding by the customer of the configurations and/or customizations of the software, enables a deeper analysis by the customer of relationships between the operational data and the customizations and the configurations, and/or the like.

In some implementations, the one or more actions may include the configuration platform providing the configuration data associated with the software to the client device or the data structure. In this way, the configuration platform may provide configuration information that enables a more comprehensive understanding by the customer of the configurations of the software, enables a deeper analysis by the customer of the configurations of the software, and/or the like.

In some implementations, the one or more actions may include the configuration platform providing, to the client device or the data structure, the customization tables linked to the set of tasks. In this way, the configuration platform provides information that the customer may utilize to understand and utilize the customized ERP software. This conserves resources that would otherwise be wasted receiving questions from the customer about the customized ERP software, searching for answers to the questions, providing the answers to the customer, and/or the like.

In this way, several different stages of the process for configuring ERP software and generating a customized report about software configuration may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that configures ERP software and generates a customized report about software configuration. Further, the process for configuring ERP software and generating a customized report about software configuration conserves resources (e.g., processing resources, memory resources, network resources, and/or the like) that would otherwise be wasted searching for the information for the customized report, matching customized software information with information associated with multiple configurations and/or multiple customization tables, generating the customized report, and/or the like.

Finally, the configuration platform enables ERP software to be provided to a customer with documentation that the customer may utilize to understand and utilize the ERP software. This conserves resources that would otherwise be wasted receiving questions from the customer about the ERP software, searching for answers to the questions, providing the answers to the customer, and/or the like.

As indicated above, FIGS. 1A-1H are provided merely as examples. Other examples may differ from what is described with regard to FIGS. 1A-1H.

Figure 2:
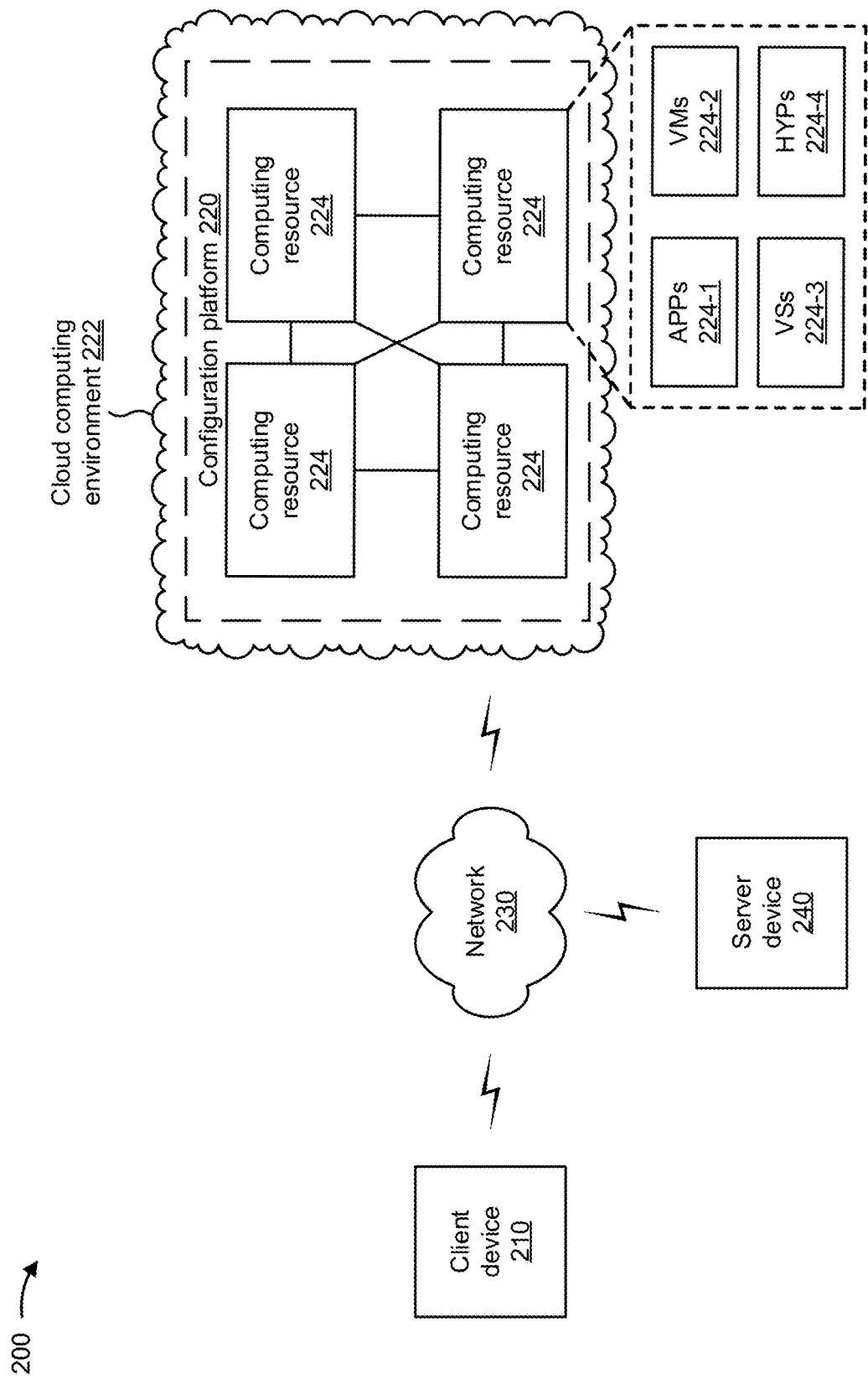
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a configuration platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to configuration platform 220 and/or server device 240.

Configuration platform 220 includes one or more devices that configure enterprise resource planning software and generate a customized report about software configuration. In some implementations, configuration platform 220 may be designed to be modular such that certain software components may be swapped in or out depending on a particular need. As such, configuration platform 220 may be easily and/or quickly reconfigured for different uses. In some implementations, configuration platform 220 may receive information from and/or transmit information to one or more client devices 210 and/or server devices 240.

In some implementations, as shown, configuration platform 220 may be hosted in a cloud computing environment 222. Notably, while implementations described herein describe configuration platform 220 as being hosted in cloud computing environment 222, in some implementations, configuration platform 220 may not be cloud-based (i.e., may be implemented outside of a cloud computing environment) or may be partially cloud-based.

Cloud computing environment 222 includes an environment that hosts configuration platform 220. Cloud computing environment 222 may provide computation, software, data access, storage, etc., services that do not require end-user knowledge of a physical location and configuration of system(s) and/or device(s) that hosts configuration platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host configuration platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with configuration platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of configuration platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or configuration platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
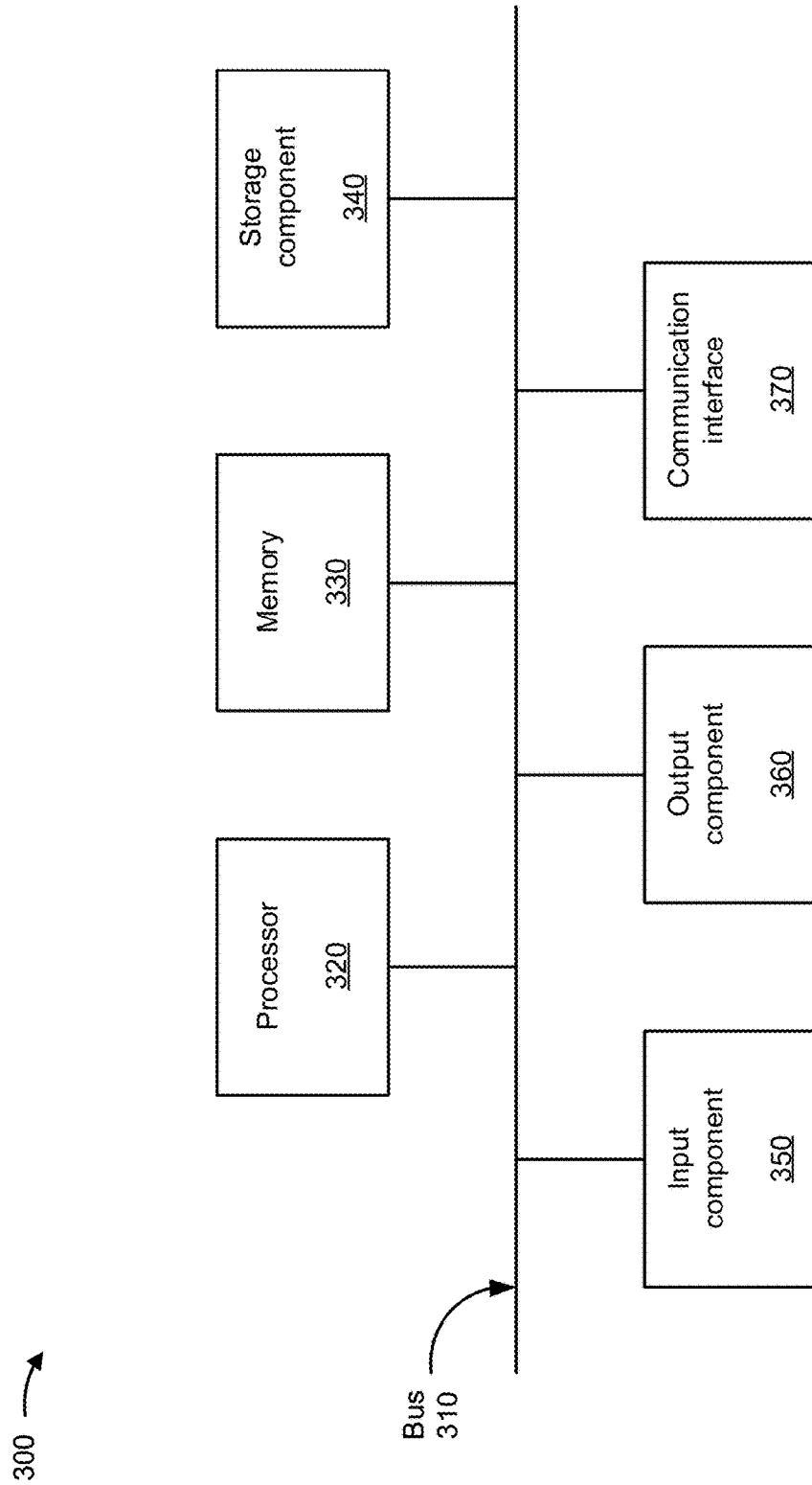
FIG. 3 is a diagram of example components of one or more devices of FIG. 2.

FIG. 3 is a diagram of example components of a device 300. Device 300 may correspond to client device 210, configuration platform 220, computing resource 224, and/or server device 240. In some implementations, client device 210, configuration platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring enterprise resource planning software and generating a customized report about software configuration. In some implementations, one or more process blocks of FIG. 4 may be performed by a configuration platform (e.g., configuration platform 220). In some implementations, one or more process blocks of FIG. 4 may be performed by another device or a group of devices separate from or including the configuration platform, such as a client device (e.g., client device 210), a server device (e.g., server device 240), and/or the like.

As shown in FIG. 4, process 400 may include receiving operational data associated with software provided by an enterprise resource planning platform, wherein the operational data includes data identifying tasks performed by the software (block 410). For example, the configuration platform (e.g., using computing resource 224, processor 320, communication interface 370, and/or the like) may receive operational data associated with software provided by an enterprise resource planning platform, as described above. In some implementations, the operational data may include data identifying tasks performed by the software.

As further shown in FIG. 4, process 400 may include receiving customization tables associated with the software provided by the enterprise resource planning platform, wherein the customization tables include tables that store customization settings associated with the tasks (block 420). For example, the configuration platform (e.g., using computing resource 224, processor 320, input component 350, communication interface 370, and/or the like) may receive customization tables associated with the software provided by the enterprise resource planning platform, as described above. In some implementations, the customization tables may include tables that store customization settings associated with the tasks.

As further shown in FIG. 4, process 400 may include receiving configuration data associated with the software provided by the enterprise resource planning platform, wherein the configuration data includes data identifying configurations associated with the tasks (block 430). For example, the configuration platform (e.g., using computing resource 224, processor 320, communication interface 370, and/or the like) may receive configuration data associated with the software provided by the enterprise resource planning platform, as described above. In some implementations, the configuration data may include data identifying configurations associated with the tasks.

As further shown in FIG. 4, process 400 may include receiving test result data associated with the software provided by the enterprise resource planning platform, wherein the test result data includes data identifying test results associated with testing the tasks (block 440). For example, the configuration platform (e.g., using computing resource 224, processor 320, memory 330, communication interface 370, and/or the like) may receive test result data associated with the software provided by the enterprise resource planning platform, as described above. In some implementations, the test result data may include data identifying test results associated with testing the tasks.

As further shown in FIG. 4, process 400 may include determining a plurality of links between a set of tasks, of the tasks, and a plurality of customization tables, of the customization tables, based on the test result data (block 450). For example, the configuration platform (e.g., using computing resource 224, processor 320, storage component 340, and/or the like) may determine a plurality of links between the set of tasks and a plurality of customization tables, of the customization tables, based on the test result data, as described above.

As further shown in FIG. 4, process 400 may include performing one or more actions based on the operational data, the plurality of customization tables, the configuration data, and the plurality of links (block 460). For example, the configuration platform (e.g., using computing resource 224, processor 320, memory 330, storage component 340, communication interface 370, and/or the like) may perform one or more actions based on the operational data, the plurality of customization tables, the configuration data, and the plurality of links, as described above.

Process 400 may include additional implementations, such as any single implementation or any combination of implementations described below and/or in connection with one or more other processes described elsewhere herein.

In a first implementation, when performing the one or more actions, the configuration platform may generate a report based on the operational data, the plurality of customization tables, the configuration data, and the plurality of links.

In a second implementation, alone or in combination with the first implementation, when performing the one or more actions, the configuration platform may provide the report to a client device associated with a customer of the software provided by the enterprise resource planning platform, may provide the report to a data structure associated with a customer of the software provided by the enterprise resource planning platform, or may provide the report, for display, to the client device.

In a third implementation, alone or in combination with one or more of the first and second implementations, when performing the one or more actions, the configuration platform may provide the operational data to a client device or a data structure associated with a customer of the software provided by the enterprise resource planning platform, may provide the configuration data to the client device or the data structure, or may provide the plurality of customization tables to the client device or the data structure.

In a fourth implementation, alone or in combination with one or more of the first through third implementations, when determining the plurality of links between the set of tasks and the plurality of customization tables, of the customization tables, the configuration platform may determine a particular link between a particular task and a particular customization table when the test result data indicates that particular customization settings of the particular customization table were modified for the particular task.

In a fifth implementation, alone or in combination with one or more of the first through fourth implementations, when determining the plurality of links between the set of tasks and the plurality of customization tables, of the customization tables, the configuration platform may establish a particular link between a particular task and a particular customization table when the test result data indicates that particular customization settings of the particular customization table were modified for the particular task, or may prevent establishment of the particular link between the particular task and the particular customization table when the test result data indicates that particular customization settings of the particular customization table were not modified for the particular task. The particular link may be included in the plurality of links when the test result data indicates that particular customization settings of the particular customization table were modified for the particular task. The particular task may be included in the set of tasks, and the particular customization table may be included in the plurality of customization tables.

In a sixth implementation, alone or in combination with one or more of the first through fifth implementations, the configuration platform may process the operational data, based on the configuration data, to identify the set of tasks from the tasks performed by the software, where the set of tasks have been configured.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for configuring enterprise resource planning software and generating a customized report about software configuration. In some implementations, one or more process blocks of FIG. 5 may be performed by a configuration platform (e.g., configuration platform 220). In some implementations, one or more process blocks of FIG. 5 may be performed by another device or a group of devices separate from or including the configuration platform, such as a client device (e.g., client device 210), a server device (e.g., server device 240), and/or the like.

As shown in FIG. 5, process 500 may include obtaining operational data associated with software provided by an enterprise resource planning platform, wherein the operational data includes data identifying tasks performed by the software (block 510). For example, the configuration platform (e.g., using computing resource 224, processor 320, communication interface 370, and/or the like) may obtain operational data associated with software provided by an enterprise resource planning platform, as described above. In some implementations, the operational data may include data identifying tasks performed by the software.

As further shown in FIG. 5, process 500 may include obtaining customization tables associated with the software provided by the enterprise resource planning platform, wherein the customization tables include tables that store customization settings associated with the tasks (block 520). For example, the configuration platform (e.g., using computing resource 224, processor 320, input component 350, communication interface 370, and/or the like) may obtain customization tables associated with the software provided by the enterprise resource planning platform, as described above. In some implementations, the customization tables may include tables that store customization settings associated with the tasks.

As further shown in FIG. 5, process 500 may include obtaining configuration data associated with the software provided by the enterprise resource planning platform, wherein the configuration data includes data identifying configurations associated with the tasks (block 530). For example, the configuration platform (e.g., using computing resource 224, processor 320, communication interface 370, and/or the like) may obtain configuration data associated with the software provided by the enterprise resource planning platform, as described above. In some implementations, the configuration data may include data identifying configurations associated with the tasks.

As further shown in FIG. 5, process 500 may include obtaining test result data associated with the software provided by the enterprise resource planning platform, wherein the test result data includes data identifying test results associated with testing the tasks (block 540). For example, the configuration platform (e.g., using computing resource 224, processor 320, memory 330, communication interface 370, and/or the like) may obtain test result data associated with the software provided by the enterprise resource planning platform, as described above. In some implementations, the test result data may include data identifying test results associated with testing the tasks.

As further shown in FIG. 5, process 500 may include processing the operational data, based on the configuration data, to identify a set of tasks, from the tasks performed by the software, that have been configured (block 550). For example, the configuration platform (e.g., using computing resource 224, processor 320, memory 330, and/or the like) may process the operational data, based on the configuration data, to identify a set of tasks, from the tasks performed by the software, that have been configured, as described above.

As further shown in FIG. 5, process 500 may include determining a plurality of links between the set of tasks and a plurality of customization tables, of the customization tables, based on the test result data (block 560). For example, the configuration platform (e.g., using computing resource 224, processor 320, storage component 340, and/or the like) may determine a plurality of links between the set of tasks and a plurality of customization tables, of the customization tables, based on the test result data, as described above.

As further shown in FIG. 5, process 500 may include generating a report based on the operational data, the plurality of customization tables, the configuration data, and the plurality of links, wherein the report includes information identifying one or more of a function of each task in the set of tasks, modifications made to the set of tasks, considerations to be made if further modifications are made to the set of tasks, or the plurality of links (block 570). For example, the configuration platform (e.g., using computing resource 224, processor 320, memory 330, storage component 340, and/or the like) may generate a report based on the operational data, the plurality of customization tables, the configuration data, and the plurality of links, as described above. In some implementations, the report may include information identifying one or more of a function of each task in the set of tasks, modifications made to the set of tasks, considerations to be made if further modifications are made to the set of tasks, or the plurality of links.

As further shown in FIG. 5, process 500 may include providing the report to a client device or a data structure associated with a customer of the software provided by the enterprise resource planning platform (block 580). For example, the configuration platform (e.g., using computing resource 224, processor 320, communication interface 370, and/or the like) may provide the report to a client device or a data structure associated with a customer of the software provided by the enterprise resource planning platform, as described above.

Process 500 may include additional implementations, such as any single implementation or any combination of implementations described below and/or in connection with one or more other processes described elsewhere herein.

In a first implementation, the tasks performed by the software may include one or more of an item procurement for a project, a schedule for the project, a milestone for the project, or a required payment for the project.

In a second implementation, alone or in combination with the first implementation, the software provided by the enterprise resource planning platform may include one or more of a design application customized for the customer, a project management application customized for the customer, a project administration application customized for the customer, or a delivery view application customized for the customer.

In a third implementation, alone or in combination with one or more of the first and second implementations, when generating the report, the configuration platform may automatically populate one or more documents with information that is based on the operational data, the plurality of customization tables, the configuration data, and the plurality of links.

In a fourth implementation, alone or in combination with one or more of the first through third implementations, when generating the report, the configuration platform may generate one or more documents, of the report, that include information indicating one or more of customizations made to the software at particular locations, explanations of the tasks performed by the software, or considerations to be taken into account by the customer if the customer wishes to further customize the software.

In a fifth implementation, alone or in combination with one or more of the first through fourth implementations, the test result data may include data identifying results associated with testing the tasks for functionality.

In a sixth implementation, alone or in combination with one or more of the first through fifth implementations, the configuration data may include records identifying modifications made to one or more of the tasks.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for configuring enterprise resource planning software and generating a customized report about software configuration. In some implementations, one or more process blocks of FIG. 6 may be performed by a configuration platform (e.g., configuration platform 220). In some implementations, one or more process blocks of FIG. 6 may be performed by another device or a group of devices separate from or including the configuration platform, such as a client device (e.g., client device 210), a server device (e.g., server device 240), and/or the like.

As shown in FIG. 6, process 600 may include receiving operational data associated with software provided by an enterprise resource planning platform, wherein the operational data includes data identifying tasks performed by the software (block 610). For example, the configuration platform (e.g., using computing resource 224, processor 320, communication interface 370, and/or the like) may receive operational data associated with software provided by an enterprise resource planning platform, as described above. In some implementations, the operational data may include data identifying tasks performed by the software.

As further shown in FIG. 6, process 600 may include receiving customization tables associated with the software provided by the enterprise resource planning platform, wherein the customization tables include tables that store customization settings associated with the tasks (block 620). For example, the configuration platform (e.g., using computing resource 224, processor 320, input component 350, communication interface 370, and/or the like) may receive customization tables associated with the software provided by the enterprise resource planning platform, as described above. In some implementations, the customization tables may include tables that store customization settings associated with the tasks.

As further shown in FIG. 6, process 600 may include receiving configuration data associated with the software provided by the enterprise resource planning platform, wherein the configuration data includes data identifying configurations associated with the tasks (block 630). For example, the configuration platform (e.g., using computing resource 224, processor 320, communication interface 370, and/or the like) may receive configuration data associated with the software provided by the enterprise resource planning platform, as described above. In some implementations, the configuration data may include data identifying configurations associated with the tasks.

As further shown in FIG. 6, process 600 may include receiving test result data associated with the software provided by the enterprise resource planning platform, wherein the test result data includes data identifying test results associated with testing the tasks (block 640). For example, the configuration platform (e.g., using computing resource 224, processor 320, communication interface 370, and/or the like) may receive test result data associated with the software provided by the enterprise resource planning platform, as described above. In some implementations, the test result data may include data identifying test results associated with testing the tasks.

As further shown in FIG. 6, process 600 may include processing the operational data, based on the configuration data, to identify a set of tasks, from the tasks performed by the software, that have been configured (block 650). For example, the configuration platform (e.g., using computing resource 224, processor 320, memory 330, and/or the like) may process the operational data, based on the configuration data, to identify a set of tasks, from the tasks performed by the software, that have been configured, as described above.

As further shown in FIG. 6, process 600 may include determining a plurality of links between the set of tasks and a plurality of customization tables, of the customization tables, based on the test result data (block 660). For example, the configuration platform (e.g., using computing resource 224, processor 320, storage component 340, and/or the like) may determine a plurality of links between the set of tasks and a plurality of customization tables, of the customization tables, based on the test result data, as described above.

As further shown in FIG. 6, process 600 may include generating a report that includes at least information identifying the plurality of customization tables and the plurality of links (block 670). For example, the configuration platform (e.g., using computing resource 224, processor 320, memory 330, storage component 340, and/or the like) may generate a report that includes at least information identifying the plurality of customization tables and the plurality of links, as described above.

Process 600 may include additional implementations, such as any single implementation or any combination of implementations described below and/or in connection with one or more other processes described elsewhere herein.

In a first implementation, the configuration platform may provide the report to a client device associated with a customer of the software provided by the enterprise resource planning platform, may provide the report to a data structure associated with a customer of the software provided by the enterprise resource planning platform, or may provide the report, for display, to the client device.

In a second implementation, alone or in combination with the first implementation, the configuration platform may provide the operational data to a client device or a data structure associated with a customer of the software provided by the enterprise resource planning platform, may provide the configuration data to the client device or the data structure, or may provide the plurality of customization tables to the client device or the data structure.

In a third implementation, alone or in combination with one or more of the first and second implementations, when determining the plurality of links between the set of tasks and the plurality of customization tables, of the customization tables, the configuration platform may determine a particular link between a particular task and a particular customization table when the test result data indicates that particular customization settings of the particular customization table were modified for the particular task. The particular link may be included in the plurality of links, the particular task may be included in the set of tasks, and the particular customization table may be included in the plurality of customization tables.

In a fourth implementation, alone or in combination with one or more of the first through third implementations, the software provided by the enterprise resource planning platform may include a customized object provided by the enterprise resource planning platform.

In a fifth implementation, alone or in combination with one or more of the first through fourth implementations, the software provided by the enterprise resource planning platform may include one or more of a design application customized for a customer, a project management application customized for the customer, a project administration application customized for the customer, or a delivery view application customized for the customer.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, operational data associated with software provided by an enterprise resource planning platform,
      wherein the operational data includes data identifying tasks performed by the software;
   receiving, by the device, customization tables associated with the software provided by the enterprise resource planning platform,
      wherein the customization tables include tables that store customization settings associated with the tasks;
   receiving, by the device, configuration data associated with the software provided by the enterprise resource planning platform,
      wherein the configuration data includes data identifying configurations associated with the tasks;
   receiving, by the device, test result data associated with the software provided by the enterprise resource planning platform,
      wherein the test result data includes data identifying test results associated with testing the tasks;
   determining, by the device, a plurality of links between a set of tasks, of the tasks, and a plurality of customization tables, of the customization tables, based on the test result data; and
   performing, by the device, one or more actions based on the operational data, the plurality of customization tables, the configuration data, and the plurality of links.

2. The method of claim 1, wherein performing the one or more actions comprises:
   generating a report based on the operational data, the plurality of customization tables, the configuration data, and the plurality of links,
      wherein the report includes information identifying one or more of:
         a function of each task in the set of tasks,
         modifications made to the set of tasks,
         considerations to be made if further modifications are made to the set of tasks, or
         the plurality of links.

3. The method of claim 2, wherein performing the one or more actions comprises one or more of:
   providing the report to a client device associated with a customer of the software provided by the enterprise resource planning platform;
   providing the report to a data structure associated with the customer of the software provided by the enterprise resource planning platform; or
   providing the report, for display, to the client device.

4. The method of claim 2, wherein performing the one or more actions comprises one or more of:
   providing the operational data to a client device or a data structure associated with a customer of the software provided by the enterprise resource planning platform;
   providing the configuration data to the client device or the data structure; or
   providing the plurality of customization tables to the client device or the data structure.

5. The method of claim 1, wherein determining the plurality of links between the set of tasks and the plurality of customization tables, of the customization tables, comprises:
determining a particular link between a particular task and a particular customization table when the test result data indicates that particular customization settings of the particular customization table were modified for the particular task,
wherein the particular link is included in the plurality of links,
wherein the particular task is included in the set of tasks, and
wherein the particular customization table is included in the plurality of customization tables.

6. The method of claim 1, wherein determining the plurality of links between the set of tasks and the plurality of customization tables, of the customization tables, comprises:
establishing a particular link between a particular task and a particular customization table when the test result data indicates that particular customization settings of the particular customization table were modified for the particular task; or
preventing establishment of the particular link between the particular task and the particular customization table when the test result data indicates that particular customization settings of the particular customization table were not modified for the particular task,
wherein the particular link is included in the plurality of links when the test result data indicates that particular customization settings of the particular customization table were modified for the particular task,
wherein the particular task is included in the set of tasks, and
wherein the particular customization table is included in the plurality of customization tables.

7. The method of claim 1, further comprising:
processing the operational data, based on the configuration data, to identify the set of tasks from the tasks performed by the software
wherein the set of tasks have been configured.

8. A device, comprising:
one or more memories; and
one or more processors, communicatively coupled to the one or more memories, configured to:
obtain operational data associated with software provided by an enterprise resource planning platform,
wherein the operational data includes data identifying tasks performed by the software;
obtain customization tables associated with the software provided by the enterprise resource planning platform,
wherein the customization tables include tables that store customization settings associated with the tasks;
obtain configuration data associated with the software provided by the enterprise resource planning platform,
wherein the configuration data includes data identifying configurations associated with the tasks;
obtain test result data associated with the software provided by the enterprise resource planning platform,
wherein the test result data includes data identifying test results associated with testing the tasks;
process the operational data, based on the configuration data, to identify a set of tasks, from the tasks performed by the software, that have been configured;
determine a plurality of links between the set of tasks and a plurality of customization tables, of the customization tables, based on the test result data;
generate a report based on the operational data, the plurality of customization tables, the configuration data, and the plurality of links,
wherein the report includes information identifying one or more of:
a function of each task in the set of tasks,
modifications made to the set of tasks,
considerations to be made if further modifications are made to the set of tasks, or
the plurality of links; and
provide the report to a client device or a data structure associated with a customer of the software provided by the enterprise resource planning platform.

9. The device of claim 8, wherein the tasks performed by the software include one or more of:
an item procurement for a project,
a schedule for the project,
a milestone for the project, or
a required payment for the project.

10. The device of claim 8, wherein the software provided by the enterprise resource planning platform includes one or more of:
a design application customized for the customer,
a project management application customized for the customer,
a project administration application customized for the customer, or
a delivery view application customized for the customer.

11. The device of claim 8, wherein the one or more processors, when generating the report, are configured to:
automatically populate one or more documents with information that is based on the operational data, the plurality of customization tables, the configuration data, and the plurality of links,
wherein the report includes the one or more documents.

12. The device of claim 8, wherein the one or more processors, when generating the report, are configured to:
generate one or more documents, of the report, that include information indicating one or more of:
customizations made to the software at particular locations,
explanations of the tasks performed by the software, or
considerations to be taken into account by the customer if the customer wishes to further customize the software.

13. The device of claim 8, wherein the test result data includes data identifying results associated with testing the tasks for functionality.

14. The device of claim 8, wherein the configuration data includes records identifying modifications made to one or more of the tasks.

15. A non-transitory computer-readable medium storing instructions, the instructions comprising:
one or more instructions that, when executed by one or more processors, cause the one or more processors to:
receive operational data associated with software provided by an enterprise resource planning platform,
wherein the operational data includes data identifying tasks performed by the software;

receive customization tables associated with the software provided by the enterprise resource planning platform,
  wherein the customization tables include tables that store customization settings associated with the tasks;
receive configuration data associated with the software provided by the enterprise resource planning platform,
  wherein the configuration data includes data identifying configurations associated with the tasks;
receive test result data associated with the software provided by the enterprise resource planning platform,
  wherein the test result data includes data identifying test results associated with testing the tasks;
process the operational data, based on the configuration data, to identify a set of tasks, from the tasks performed by the software, that have been configured;
determine a plurality of links between the set of tasks and a plurality of customization tables, of the customization tables, based on the test result data; and
generate a report that includes at least information identifying the plurality of customization tables and the plurality of links.

16. The non-transitory computer-readable medium of claim 15, wherein the instructions further comprise:
one or more instructions that, when executed by the one or more processors, cause the one or more processors to one or more of:
  provide the report to a client device associated with a customer of the software provided by the enterprise resource planning platform;
  provide the report to a data structure associated with the customer of the software provided by the enterprise resource planning platform; or
  provide the report, for display, to the client device.

17. The non-transitory computer-readable medium of claim 15, wherein the instructions further comprise:
one or more instructions that, when executed by the one or more processors, cause the one or more processors to one or more of:
  provide the operational data to a client device or a data structure associated with a customer of the software provided by the enterprise resource planning platform;
  provide the configuration data to the client device or the data structure; or
  provide the plurality of customization tables to the client device or the data structure.

18. The non-transitory computer-readable medium of claim 15, wherein the one or more instructions, that cause the one or more processors to determine the plurality of links between the set of tasks and the plurality of customization tables, of the customization tables, cause the one or more processors to:
  determine a particular link between a particular task and a particular customization table when the test result data indicates that particular customization settings of the particular customization table were modified for the particular task,
    wherein the particular link is included in the plurality of links,
    wherein the particular task is included in the set of tasks, and
    wherein the particular customization table is included in the plurality of customization tables.

19. The non-transitory computer-readable medium of claim 15, wherein the software provided by the enterprise resource planning platform includes a customized object provided by the enterprise resource planning platform.

20. The non-transitory computer-readable medium of claim 15, wherein the software provided by the enterprise resource planning platform includes one or more of:
  a design application customized for a customer,
  a project management application customized for the customer,
  a project administration application customized for the customer, or
  a delivery view application customized for the customer.

* * * * *